US012676997B2

(12) United States Patent
Li et al.

(10) Patent No.: US 12,676,997 B2
(45) Date of Patent: *Jul. 7, 2026

(54) OFFSET PARAMETER SIGNALING IN MERGE MOTION VECTOR DIFFERENCE MODE

(71) Applicant: TENCENT AMERICA LLC, Palo Alto, CA (US)

(72) Inventors: Guichun Li, San Jose, CA (US); Xiaozhong Xu, State College, PA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,251

(22) Filed: Apr. 10, 2024

(65) Prior Publication Data

US 2024/0276000 A1 Aug. 15, 2024

Related U.S. Application Data

(63) Continuation of application No. 17/897,772, filed on Aug. 29, 2022, now Pat. No. 11,985,342, which is a
(Continued)

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/132* (2014.11);
(Continued)

(58) Field of Classification Search
None
See application file for complete search history.

(56) References Cited

U.S. PATENT DOCUMENTS

2013/0177084 A1 7/2013 Wang et al.
2017/0310961 A1 10/2017 Liu et al.
(Continued)

FOREIGN PATENT DOCUMENTS

JP 2019-535192 A 12/2019
WO 2017/118411 A1 7/2017
(Continued)

OTHER PUBLICATIONS

B. Bross, J. Chen, S. Liu, "Versatile Video Coding (Draft 2)", ISO/IEC JTC1/SC29/WG11 JVET-K1001, Jul. 2018.
(Continued)

*Primary Examiner* — James M Anderson, II
(74) *Attorney, Agent, or Firm* — ArentFox Schiff LLP

(57) ABSTRACT

A method for video encoding includes determining a corresponding motion vector for each of multiple control points of a base predictor. The method further includes determining a corresponding motion vector difference for each of the multiple control points of the base predictor based on the determined motion vector for each respective control point. The method further includes generating prediction information of the current block to be included in a coded video bitstream. The prediction information includes (i) a usage flag indicative of the affine merge mode with offset, (ii) offset parameters defining the determined corresponding motion vector difference for each of the one or more of the control points, and (iii) a zero motion vector difference flag for the multiple control points of the base predictor. The zero
(Continued)

motion vector difference flag indicates whether offset parameters for the respective control point are provided in the prediction information.

19 Claims, 15 Drawing Sheets

Related U.S. Application Data continuation of application No. 17/221,297, filed on Apr. 2, 2021, now Pat. No. 11,470,338, which is a continuation of application No. 16/503,451, filed on Jul. 3, 2019, now Pat. No. 10,999,589.

(60) Provisional application No. 62/741,532, filed on Oct. 4, 2018.

(51) Int. Cl.
| | |
|---|---|
| *H04N 19/132* | (2014.01) |
| *H04N 19/139* | (2014.01) |
| *H04N 19/176* | (2014.01) |
| *H04N 19/33* | (2014.01) |

(52) U.S. Cl.
CPC ......... *H04N 19/139* (2014.11); *H04N 19/176* (2014.11); *H04N 19/33* (2014.11)

(56) References Cited

U.S. PATENT DOCUMENTS

| | | | | |
|---|---|---|---|---|
| 2018/0098063 A1* | 4/2018 | Chen | .................... | H04N 19/139 |
| 2019/0246110 A1 | 8/2019 | Xu et al. | | |
| 2020/0107043 A1* | 4/2020 | Hung | .................... | H04N 19/52 |
| 2020/0120335 A1 | 4/2020 | Hung et al. | | |
| 2020/0195963 A1 | 6/2020 | Li et al. | | |

FOREIGN PATENT DOCUMENTS

| | | | |
|---|---|---|---|
| WO | 2018/067823 A1 | 4/2018 |
| WO | 2018/105582 A1 | 6/2018 |
| WO | 2018/155986 A2 | 8/2018 |
| WO | 2020/017367 A1 | 1/2020 |

OTHER PUBLICATIONS

Chinese Office Action issued Mar. 22, 2023 in Application No. 201980064358.1, pp. 1-23, with English Translation.

H. Yang, S. Liu, K. Zhang, "Description of Core Experiment 4 (CE4): Inter prediction and motion vector coding", ISO/IEC JTC1/SC29/WG11 JVET-K1024, Jul. 2018.

Hashimoto T, et al., Non-CE4: Enhanced ultimate motion vector expression, 12. JVET Meeting; Oct. 3, 2018-Oct. 12, 2018; Macao; (The Joint Video Exploration Team of ISO/IEC JTC1/SC29/WG11 and ITU-T SG.16) No. JVET-L0355 Oct. 1, 2018.

Heithausen Cordula, et al: "Distance scaling of higher order motion parameters in an extension of HEVC" , 2016 Picture Coding Symposium (PCS), IEEE, Dec. 4, 2016, pp. 1-5.

High Efficiency Video Coding , Rec. ITU-T H.265v4, Dec. 2016.

International Search Report and Written Opinion dated Oct. 8, 2019 in PCT/US19/40854 filed Jul. 8, 2019.

Japanese Office Action in 2021-517613, mailed May 18, 2022, 13 pages with English Translation.

Li (Tencent) Get Al: "CE2: Affine merge with prediction offset (Test CE2.2.4)", 13. JVET Meeting; Jan. 9, 2019-Jan. 18, 2019; Marrakech; (The Joint Video Exploration Team of Iso/Iec JTC1/SC29/WG11 and ITU-T SG.16), No. JVET-M0431, Jan. 2, 2019.

Li et al., "CE4-related: affine merge mode with prediction offsets", Joint Video Experts Team (JVET) of ITU-T SG 16 WP 3 and ISO / IEC JTC 1 / Sc 29/WG 11 12th Meeting: Macao, CN, Oct. 3-12, 2018, [JVET-L0320 ], Sep. 25, 2018, p. 1-5.

Li G, et al: "CE2: Affine merge with prediction offset (Test CE2.2.4)", 13. JVET Meeting; Jan. 9, 2019-Jan. 18, 2019; Marrakech; (The Joint Video Exploration Team of ISO/IEC JTC1/SC29/WG11 and ITU-T SG.16), No. JVET-M0431, Jan. 2, 2019.

S. Jeong, M. W. Park, C. Kim, "CE4 Ultimate motion vector expression in JVET-J0024 (Test 4.2.9)", JVET-K0115, Jul. 2018.

S. Lin, H. Chen, H. Zhang, S. Maxim, H. Yang, J. Zhou, "Affine transform prediction for next generation video coding", ITU-T SG16 Doc. COM16-C1016, Oct. 2015.

Supplementary European Search Report issued Jun. 30, 2022 in Application No. 19869290,7, pp. 1-15.

Supplementary Partial European Search Report in 19869290.7, mailed Mar. 4, 2022, 13 pages.

Yu-Chiao Yang, et al., CE4-related: Control point MV offset for Affine merge mode, Joint Video Experts Team (JVET) of ITU-T SG 16 WP 3 and ISO / IEC JTC 1 / SC 29/WG 11 12th Meeting: Macao, CN, Oct. 3-12, 2018, [JVET-L0389r1], Oct. 2, 2018, p. 1-4.

Li Li, Houqiang Li, Zhuoyi Lv, Haitao Yang, "An affine motion compensation framework for high efficiency video coding", 2015 IEEE International Symposium on Circuits and Systems (ISCAS), May 2015.

Extended European Search Report and Search Opinion received for European Application No. 24187905.5, mailed on Jan. 9, 2025, 16 pages.

Jeong et al., "CE4 Ultimate motion vector expression (Test 4.5.4)", Joint Video Experts Team (JVET) of ITU-T SG 16 WP 3 and 1S0/IEC JTC 1/SC 29/WG 11, 12th Meeting: Macao, CN, Oct. 3-12, 2018, Document: JVET-L0054, XP030193586, Sep. 21, 2018, pp. 1-5.

* cited by examiner

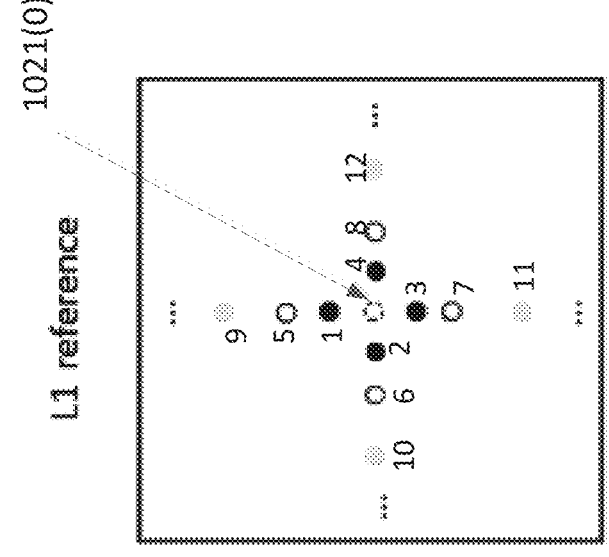
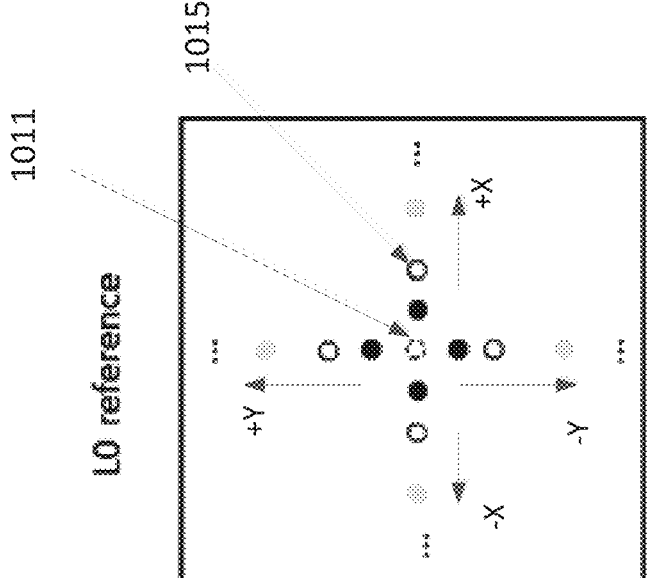
*FIG. 10*

4-parameter affine mode 6-parameter affine mode

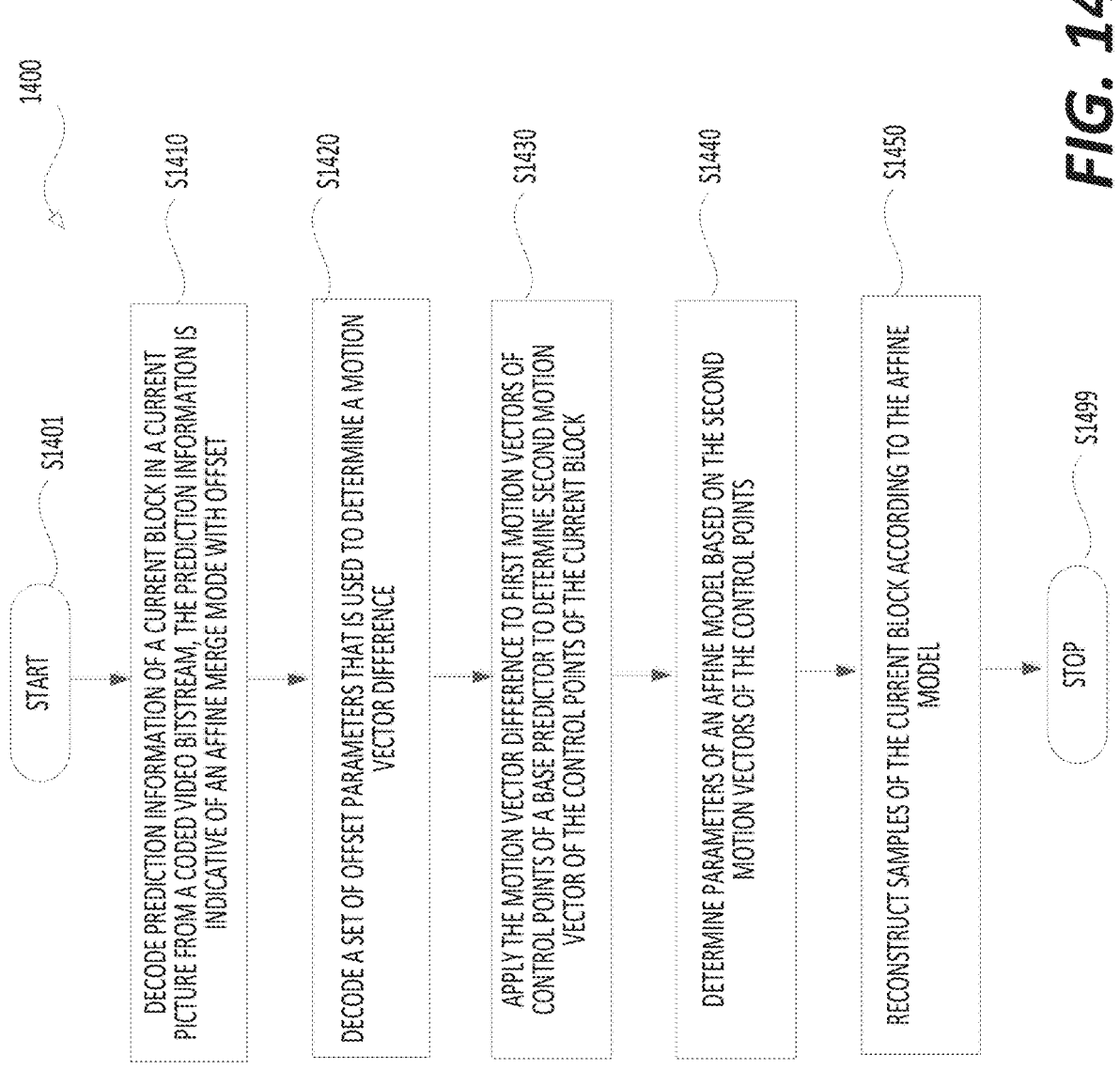

1400

START — S1401

S1410 — DECODE PREDICTION INFORMATION OF A CURRENT BLOCK IN A CURRENT PICTURE FROM A CODED VIDEO BITSTREAM, THE PREDICTION INFORMATION IS INDICATIVE OF AN AFFINE MERGE MODE WITH OFFSET

S1420 — DECODE A SET OF OFFSET PARAMETERS THAT IS USED TO DETERMINE A MOTION VECTOR DIFFERENCE

S1430 — APPLY THE MOTION VECTOR DIFFERENCE TO FIRST MOTION VECTORS OF CONTROL POINTS OF A BASE PREDICTOR TO DETERMINE SECOND MOTION VECTOR OF THE CONTROL POINTS OF THE CURRENT BLOCK

S1440 — DETERMINE PARAMETERS OF AN AFFINE MODEL BASED ON THE SECOND MOTION VECTORS OF THE CONTROL POINTS

S1450 — RECONSTRUCT SAMPLES OF THE CURRENT BLOCK ACCORDING TO THE AFFINE MODEL

STOP — S1499

*FIG. 14*

OFFSET PARAMETER SIGNALING IN MERGE MOTION VECTOR DIFFERENCE MODE

INCORPORATION BY REFERENCE

The present application is a continuation of U.S. application Ser. No. 17/897,772, "SIGNALING OF FLAG INDICATING ZERO MOTION VECTOR DIFFERENCE FOR A CONTROL POINT" filed on Aug. 29, 2022, which is a continuation of U.S. application Ser. No. 17/221,297 "METHOD AND APPARATUS FOR VIDEO CODING" filed on Apr. 2, 2021, which is a continuation of U.S. application Ser. No. 16/503,451 "METHOD AND APPARATUS FOR VIDEO CODING" filed on Jul. 3, 2019, now U.S. Pat. No. 10,999,589, which claims the benefit of priority to U.S. Provisional Application No. 62/741,532, "METHODS OF AFFINE MOTION MODEL CODING WITH PREDICTION OFFSETS" filed on Oct. 4, 2018. The disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes receiving circuitry and processing circuitry. For example, the processing circuitry decodes prediction information of a current block in a current picture from a coded video bitstream. The prediction information is indicative of an affine merge mode with offset. Then, the processing circuitry decodes, from the coded video bitstream, a set of offset parameters that is used to determine a motion vector difference, and applies the motion vector difference to first motion vectors of multiple control points of a base predictor of the current block to determine second motion vectors at corresponding multiple control points of the current block. Further, the processing circuitry determines parameters of an affine model based on the second motion vectors at the corresponding multiple control points of the current block, and reconstructs at least a sample of the current block according to the affine model.

In some embodiments, the processing circuitry decodes, from the coded video bitstream, an offset distance index and an offset direction index that are used to determine the motion vector difference, and determine an offset distance according to the offset distance index and a pre-defined mapping of offset distance indices and offset distances. Then, the processing circuitry determines an offset direction according to the offset direction index and a pre-defined mapping of offset direction indices and offset directions.

In an example, the processing circuitry applies the motion vector difference to two control points of the base predictor when a four-parameter affine model is used. In another example, the processing circuitry applies the motion vector difference to three control points of the base predictor when a six-parameter affine model is used.

In an embodiment, the processing circuitry applies the motion vector difference to the first motion vectors that refer to a first reference picture to determine the second motion vectors for the first reference picture, and applies a mirror of the motion vector difference to third motion vectors of the control points of the base predictor that refer to a second reference picture to determine fourth motion vectors at the corresponding multiple control points of the current block that refer to the second reference picture.

In another embodiment, the processing circuitry applies the motion vector difference to the first motion vectors that refer to a first reference picture to determine the second motion vectors that refer to the first reference picture, and applies a mirror of the motion vector difference to third motion vectors of the control points of the base predictor that refer to a second reference picture to determine fourth motion vectors at the corresponding multiple control points of the current block that refer to the second reference picture when the second reference picture is on an opposite side of the current picture from the first reference picture.

In some examples, the processing circuitry applies the motion vector difference to the first motion vectors that refer to a first reference picture to determine the second motion vectors that refer to the first reference picture, and calculates a scaling factor based on a first picture number difference of the first reference picture and the current picture and a second picture number difference of a second reference picture and the current picture. Further, the processing circuitry applies the motion vector difference that is scaled according to the scaling factor to third motion vectors of the control points of the base predictor that refer to the second reference picture to determine fourth motion vectors at the corresponding multiple control points of the current block that refer to the second reference picture.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 10 shows examples for UMVE according to an embodiment of the disclosure.

FIG. 14 shows a flow chart outlining a process example according to some embodiments of the disclosure.

DETAILED DESCRIPTION OF EMBODIMENTS

Figure 1:
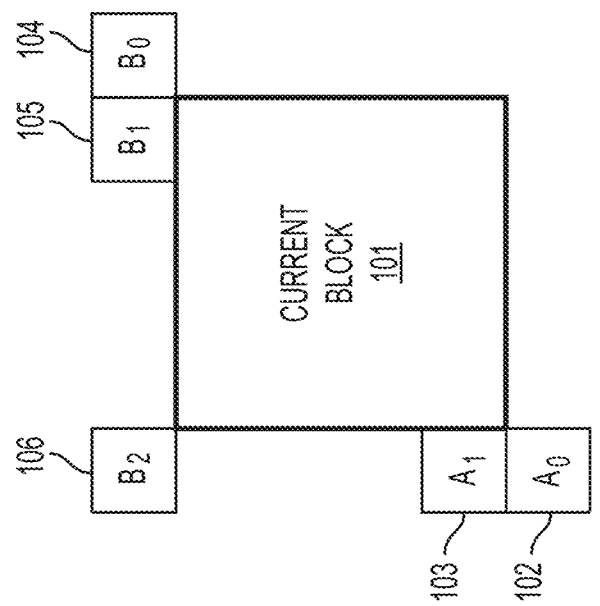
FIG. 1 is a schematic illustration of a current block and its surrounding spatial merge candidates in one example.
Figure 2:
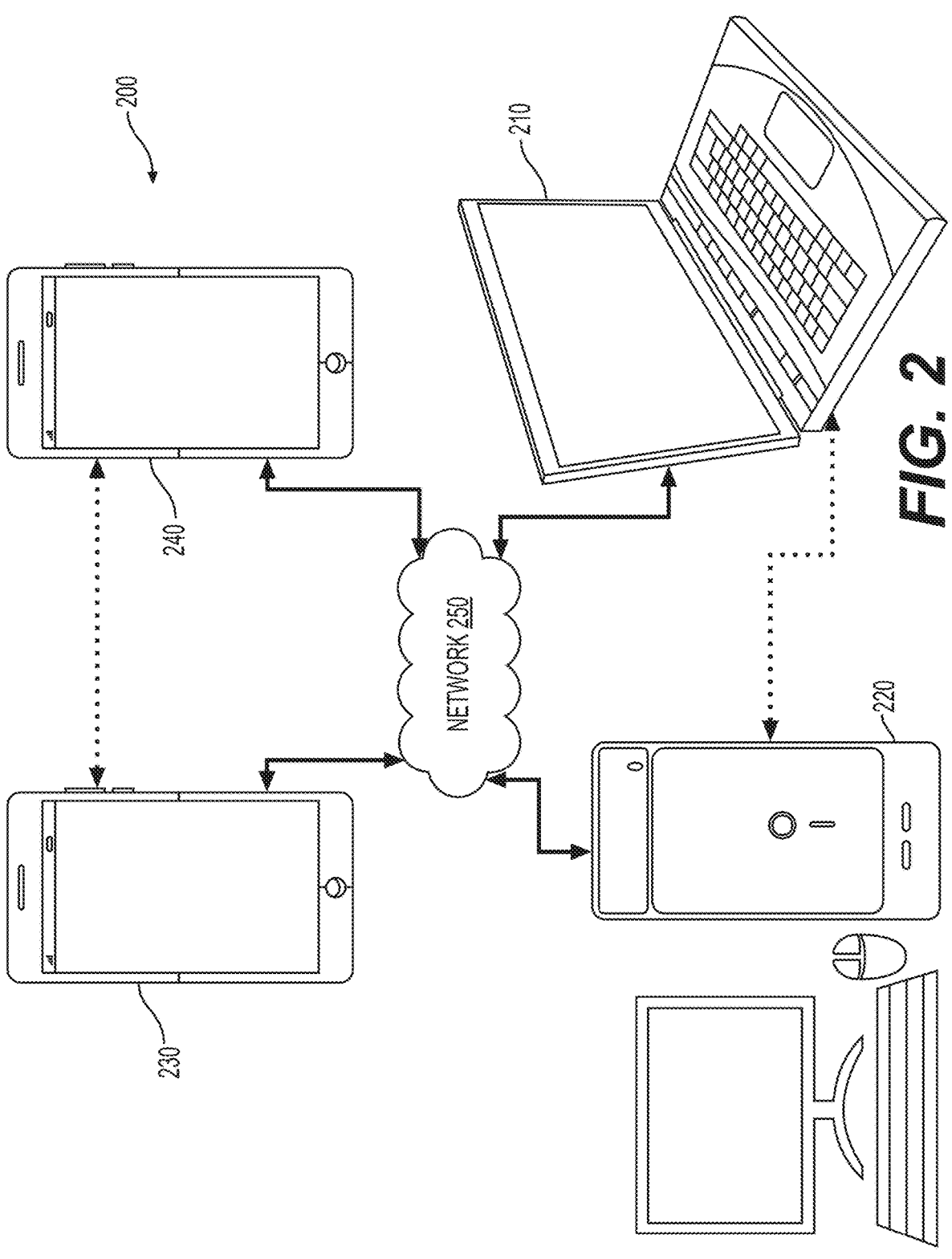
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
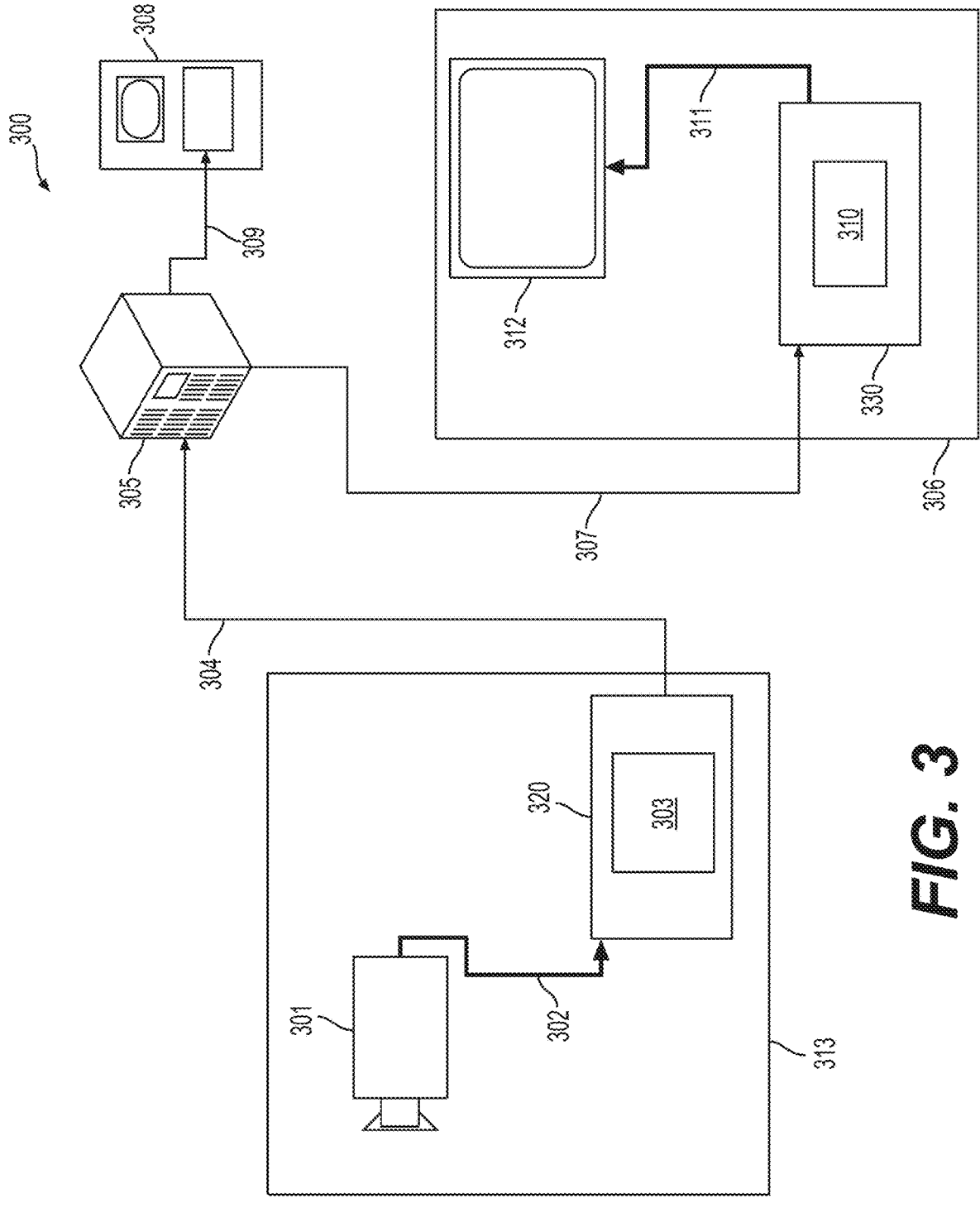
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
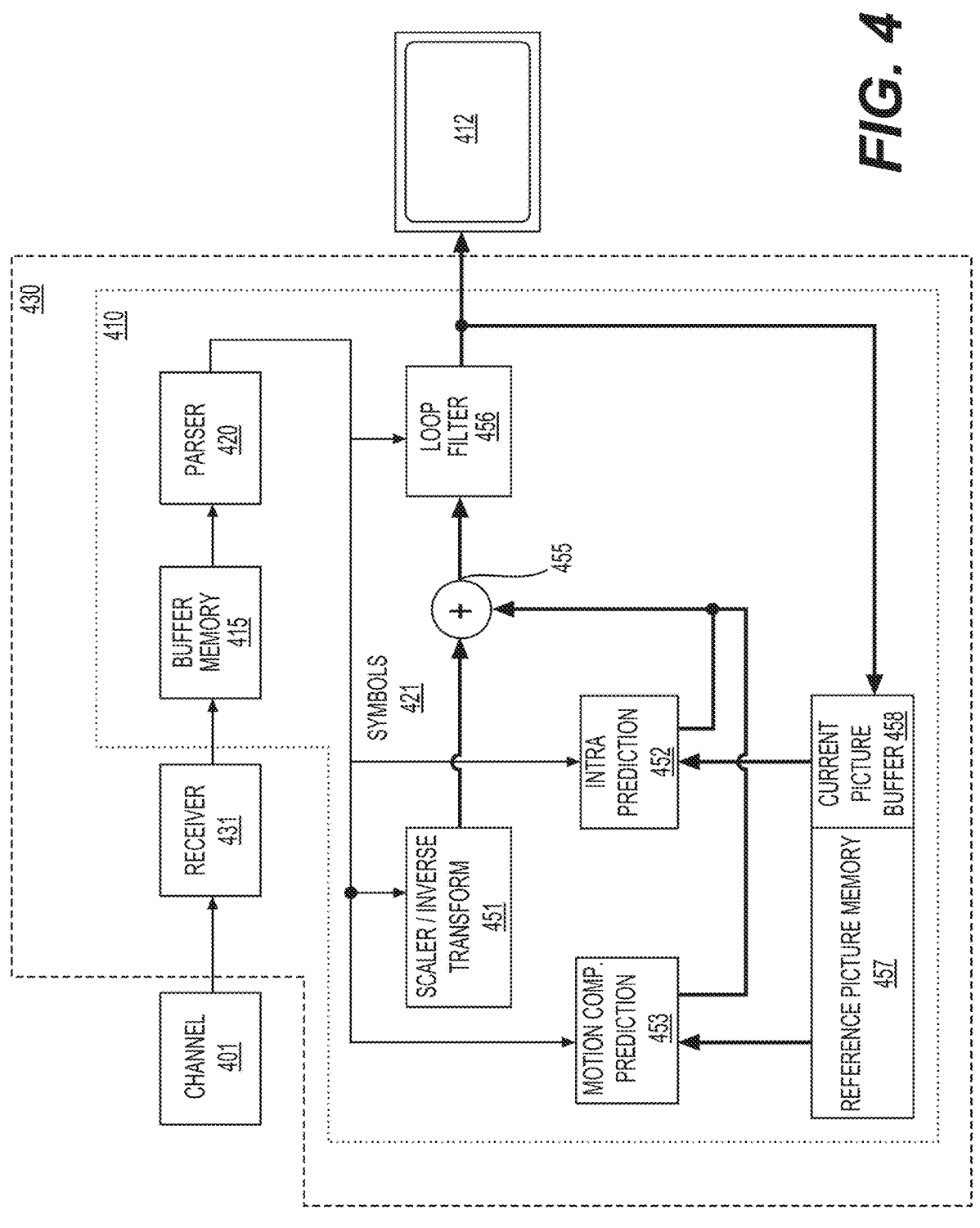
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
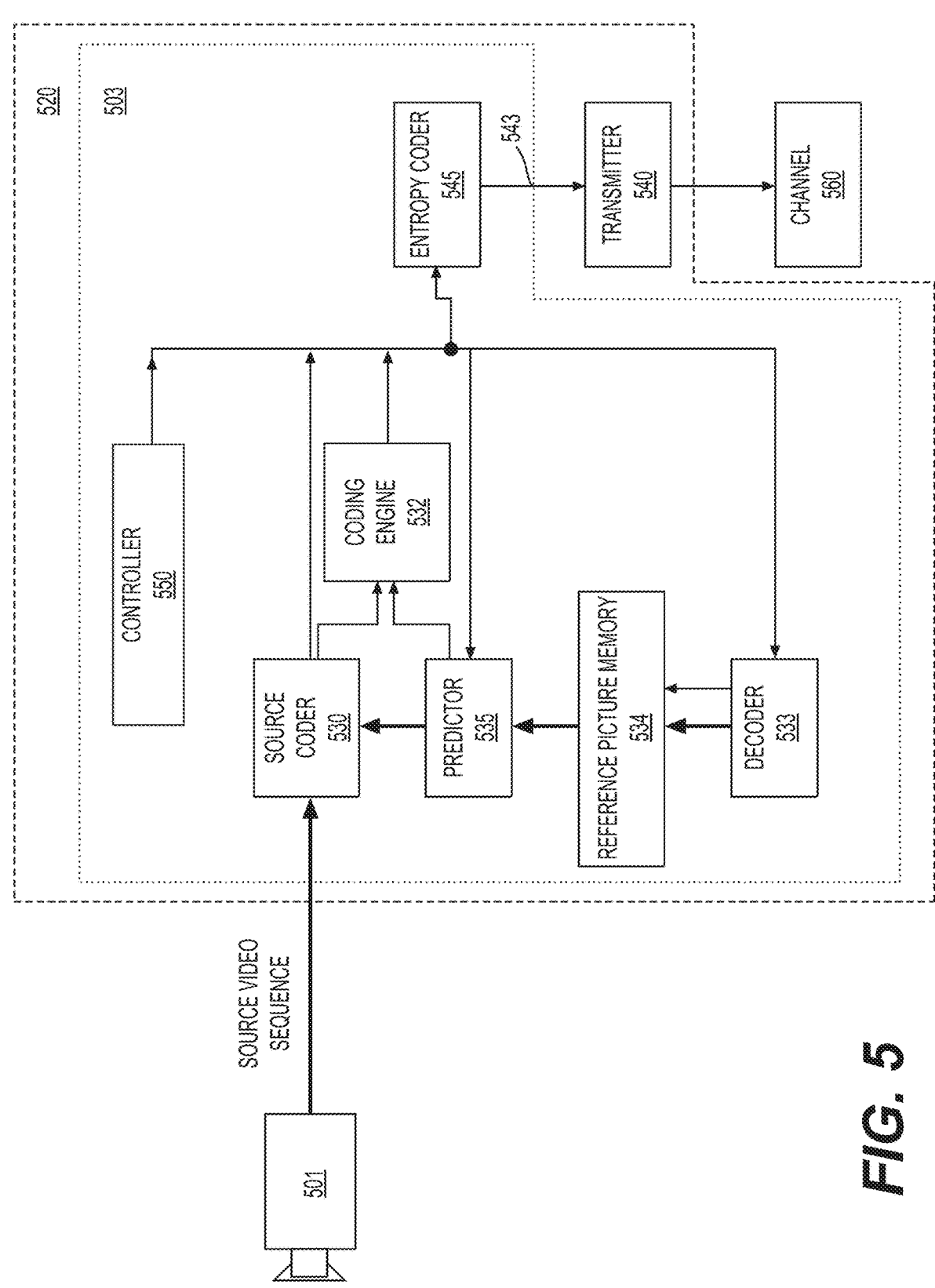
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
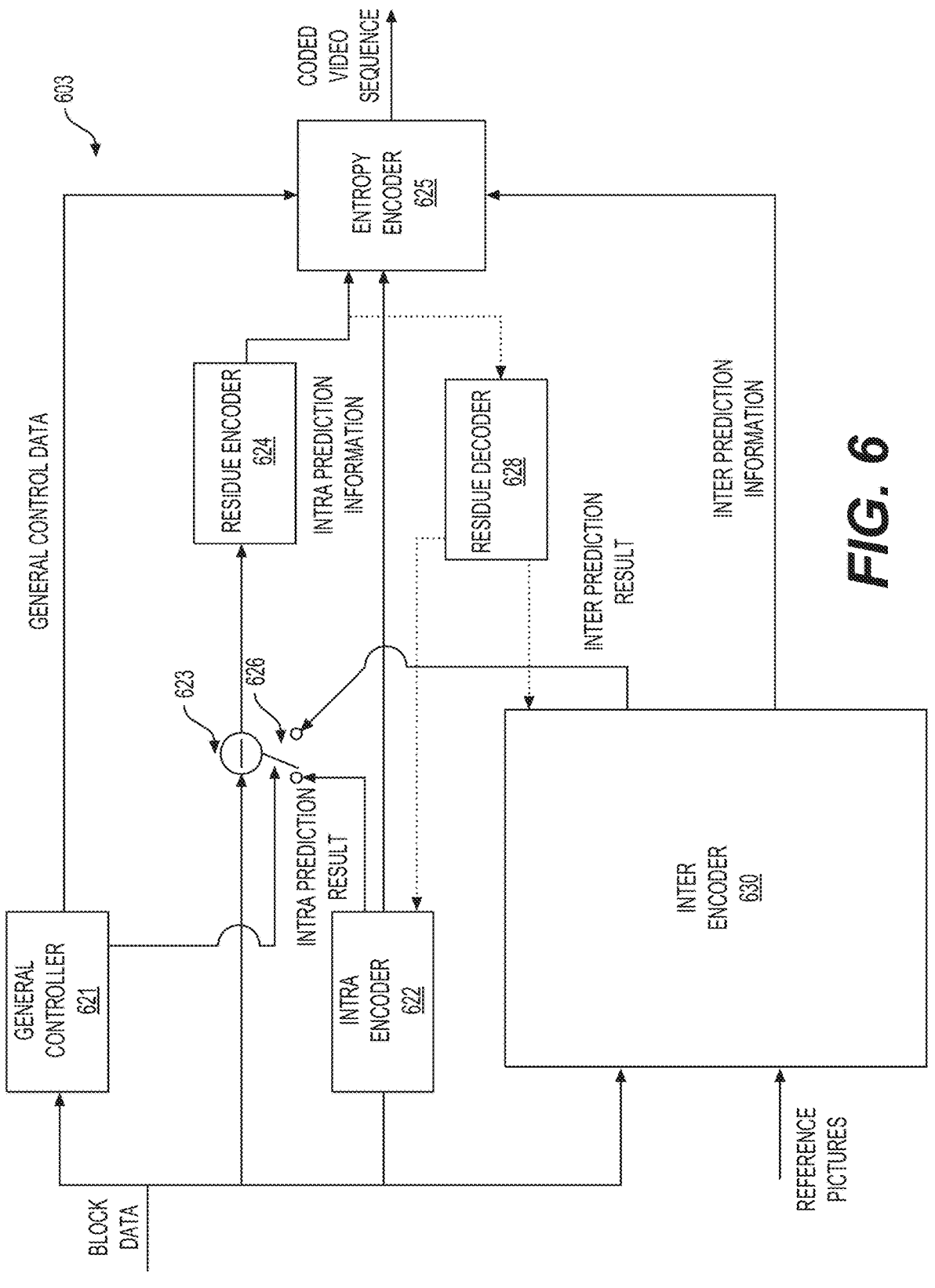
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
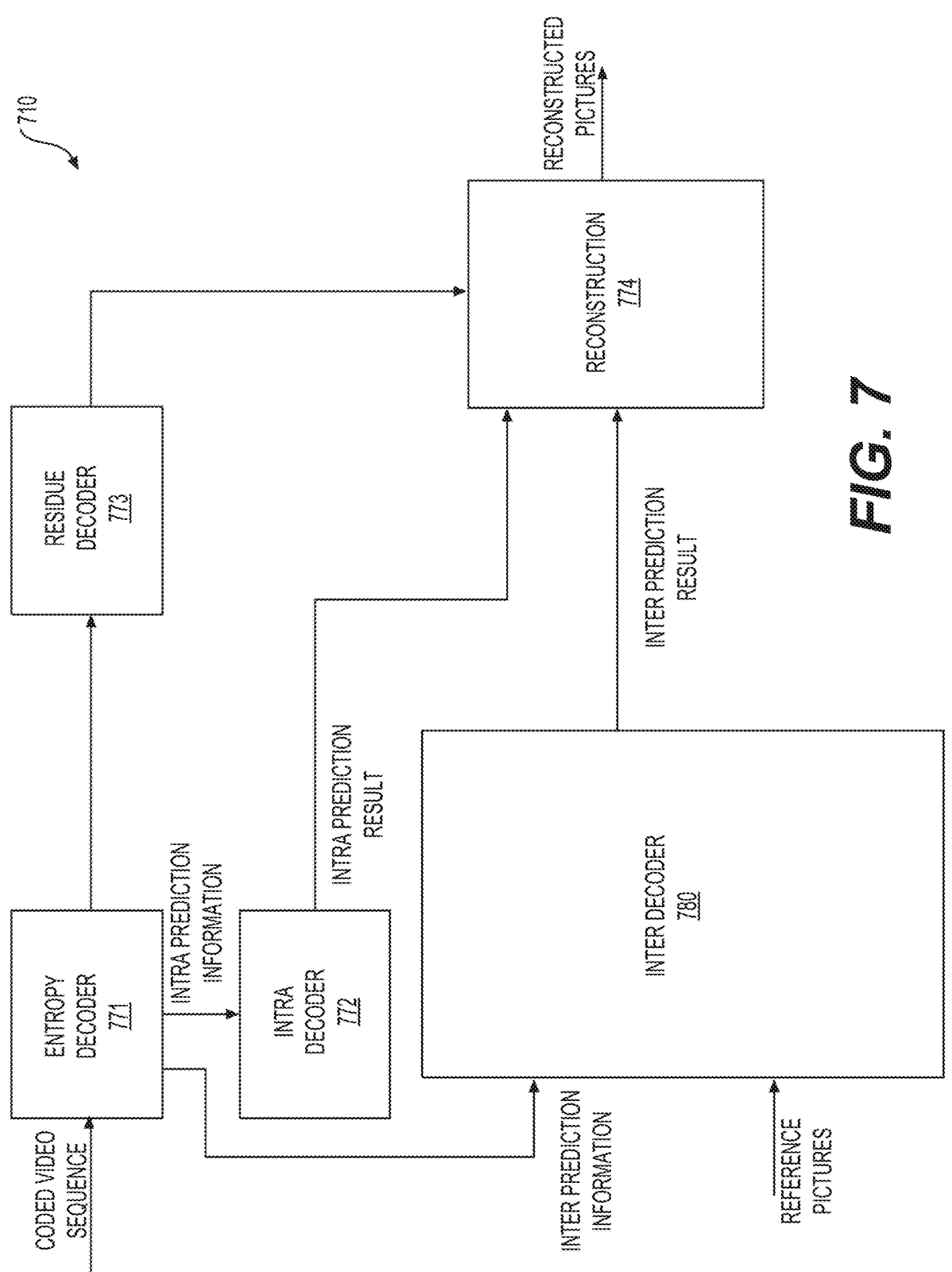
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide techniques to simplify affine motion compensation with prediction offsets.

Generally, a motion vector for a block can be coded either in an explicit way, to signal the difference to a motion vector predictor (e.g., advanced motion vector prediction or AMVP mode); or in an implicit way, to be indicated completely from one previously coded or generated motion vector. The later one is referred to as merge mode, meaning the current block is merged into a previously coded block by using its motion information.

Both merge mode and the AMVP mode construct candidate list during decoding.

Figure 8:
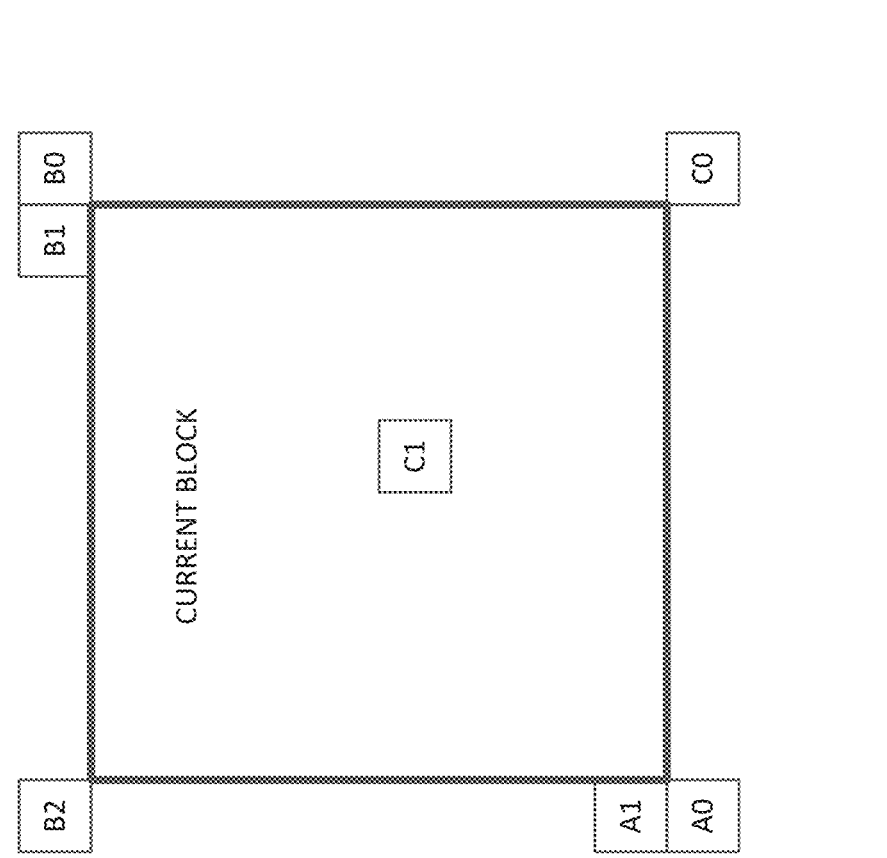
FIG. 8 shows an example of spatial and temporal candidates in some examples.

FIG. 8 shows an example of spatial and temporal candidates in some examples.

For the merge mode in the inter prediction, merge candidates in a candidate list are primarily formed by checking motion information from either spatial or temporal neighboring blocks of the current block. In the FIG. 8 example, candidate blocks A1, B1, B0, A0 and B2 are sequentially checked. When any of the candidate blocks are valid candidates, for example, are coded with motion vectors, then, the motion information of the valid candidate blocks can be added into the merge candidate list. Some pruning operation is performed to make sure duplicated candidates will not be put into the list again. The candidate blocks A1, B1, B0, A0 and B2 are adjacent to corners of the current block, and are referred to as corner candidates.

After spatial candidates, temporal candidates are also checked into the merge candidate list. In some examples, the current block's co-located block in a specified reference picture is found. The motion information at C0 position (bottom right corner of the current block) of the co-located block will be used as temporal merge candidate. If the block at this position is not coded in inter mode or not available, C1 position (at the outer bottom right corner of the center of the co-located block) will be used instead. The present disclosure provides techniques to further improve merge mode.

The advanced motion vector prediction (AMVP) mode in HEVC refers to using spatial and temporal neighboring blocks' motion information to predict the motion information of the current block, while the prediction residue is further coded. Examples of spatial and temporal neighboring candidates are shown in FIG. 8 as well.

In some embodiments, in AMVP mode, a two-candidate motion vector predictor list is formed. For example, the list includes a first candidate predictor and a second candidate predictor. The first candidate predictor is from the first available motion vector from the left edge, in the order of spatial A0, A1 positions. The second candidate predictor is from the first available motion vector from the top edge, in the order of spatial B0, B1 and B2 positions. If no valid motion vector can be found from the checked locations for either the left edge or the top edge, no candidate will be filled in the list. If the two available candidates are the same, only one will be kept in the list. If the list is not full (with two different candidates), the temporal co-located motion vector (after scaling) from C0 location will be used as another candidate. If motion information at C0 location is not available, location C1 will be used instead.

In some examples, if there are still no enough motion vector predictor candidates, zero motion vector will be used to fill up the list.

In some embodiments, prediction offsets can be signaled on top of existing merge candidates. For example, a technique that is referred to as ultimate motion vector expression (UMVE) uses a special merge mode in which an offset (both magnitude and direction) on top of the existing merge candidates is signaled. In this technique, a few syntax elements, such as a prediction direction IDX, a base candidate IDX, a distance IDX, a search direction IDX, and the like, are signaled to describe such an offset. For example, the prediction direction IDX is used to indicate which of the prediction directions (temporal prediction direction, e.g., L0 reference direction, L1 reference direction or L0 and L1 reference directions) is used for UMVE mode. The base candidate IDX is used to indicate which of the existing merge candidates is used as the start point (base candidate) to apply the offset. The distance IDX is used to indicate how large the offset is from the starting point (along x or y direction, but not both). The offset magnitude is chosen from a fix number of selections. The search direction IDX is used to indicate the direction (x or y, + or – direction) to apply the offset.

In an example, assuming the starting point MV is MV_S, the offset is MV_offset. Then the final MV predictor will be MV_final=MV_S+MV_offset.

Figure 9:
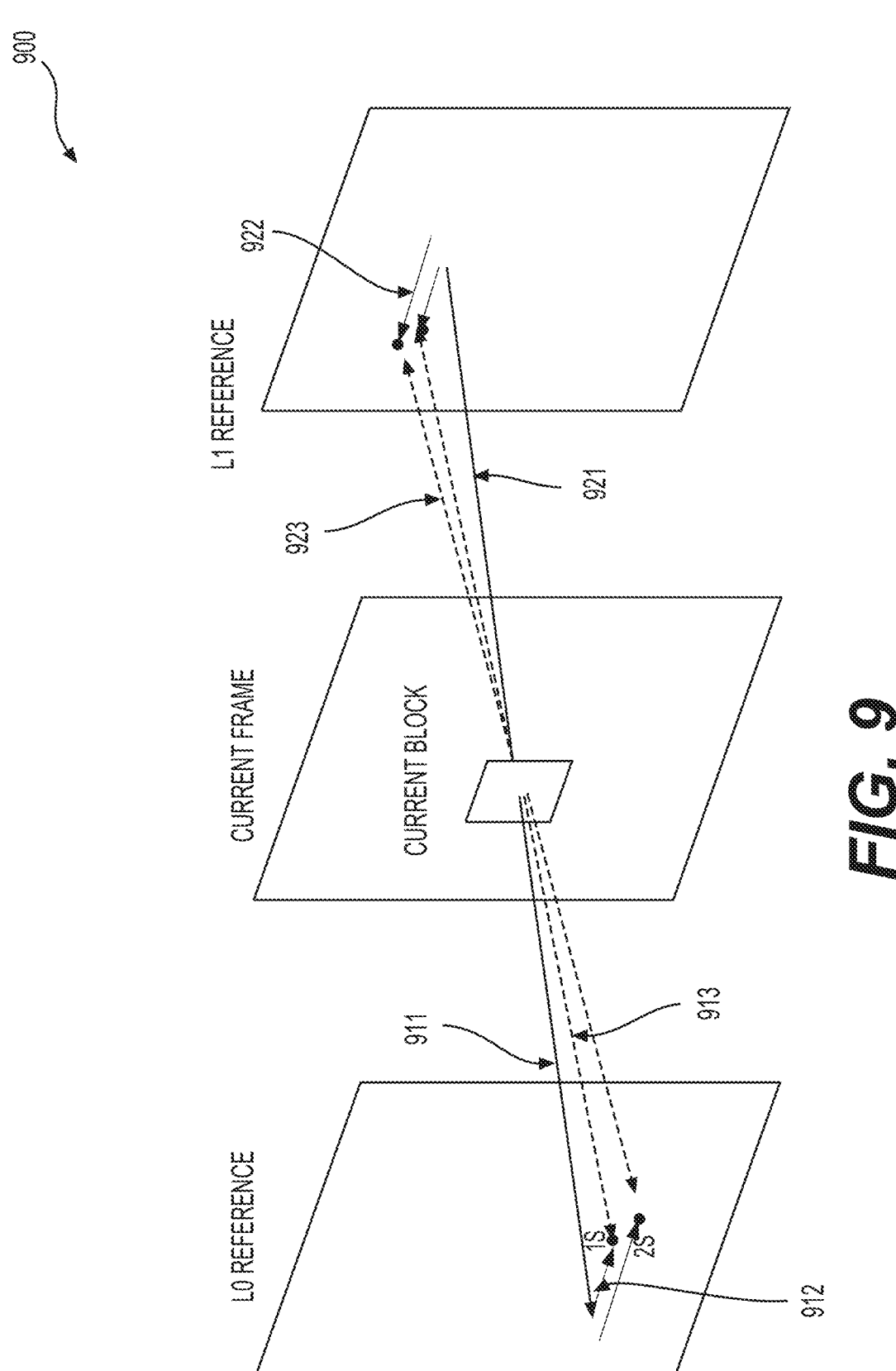
FIG. 9 shows examples for UMVE according to an embodiment of the disclosure.

FIG. 9 shows examples for UMVE according to an embodiment of the disclosure. In an example, the starting point MV is shown by (911) (for example according to the prediction direction IDX and base candidate IDX), the offset is shown by (912) (for example according to the distance IDX and the search direction IDX), and the final MV predictor is shown by (913) in FIG. 9. In another example, the starting point MV is shown by (921) (for example according to the prediction direction IDX and base candidate IDX), the offset is shown by (922) (for example according to the distance IDX and the search direction IDX), and the final MV predictor is shown by 923 in FIG. 9.

FIG. 10 shows examples for UMVE according to an embodiment of the disclosure. For example, the starting point MV is shown by (1011) (for example according to the prediction direction IDX and base candidate IDX). In the FIG. 10 example, 4 search directions, such as +Y, −Y, +X and −X, are used, and the four search directions can be indexed by 0, 1, 2, 3. The distance can be indexed by 0 (0 distance to the starting point MV), 1 (Is to the starting point MV), 2 (2 s to the starting point MV), 3 (3s to the starting point), and the like. Thus, when the search direction IDX is 3, and the distance IDX is 2, the final MV predictor is shown as 1015.

In another example, the search direction and the distance can be combined for indexing. For example, the starting point MV is shown by (1021) (for example according to the prediction direction IDX and base candidate IDX). The search direction and the distance are combined to be indexed by 0-12 as shown in FIG. 10.

According to an aspect of the disclosure, affine motion compensation, by describing a 6-parameter (or a simplified 4-parameter) affine model for a coding block, can efficiently predict the motion information for samples within the current block. More specifically, in an affine coded or described coding block, different part of the samples can have different motion vectors. The basic unit to have a motion vector in an affine coded or described block is referred to as a sub-block. The size of a sub-block can be as small as 1 sample only; and can be as large as the size of current block.

When an affine mode is determined, for each sample in the current block, its motion vector (relative to the targeted reference picture) can be derived using such a model (e.g., 6 parameter affine motion model or 4 parameter affine motion model). In order to reduce implementation complexity, affine motion compensation is performed on a sub-block basis, instead of on a sample basis. That means, each sub-block will derive its motion vector and for samples in each sub-block, the motion vector is the same. A specific location of each sub-block is assumed, such as the top-left or the center point of the sub-block, to be the representative location. In one example, such a sub-block size contains 4×4 samples.

In general, an affine motion model has 6 parameters to describe the motion information of a block. After the affine transformation, a rectangular block will become a parallelogram. In an example, the 6 parameters of an affine coded block can be represented by 3 motion vectors at three different locations of the block.

Figure 11:
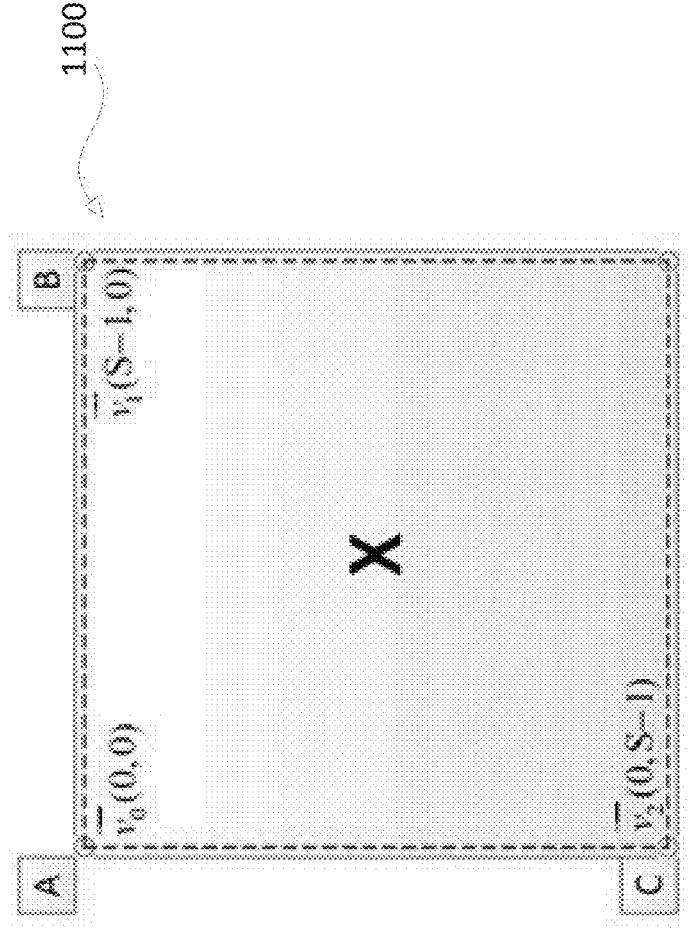
FIG. 11 shows an example of a block with an affine motion model.

FIG. 11 shows an example of a block (1100) with an affine motion model. The block (1100) uses motion vectors $\vec{v}_0$, $\vec{v}_1$, and $\vec{v}_2$ at three corner locations A, B and C to describe the motion information of the affine motion model used for the block (1100). These locations A, B and C are referred to as control points.

In a simplified example, an affine motion model uses 4 parameters to describe the motion information of a block based on an assumption that after the affine transformation, the shape of the block does not change. Therefore, a rectangular block will remain a rectangular and same aspect ratio (e.g., height/width) after the transformation. The affine motion model of such a block can be represented by two motion vectors at two different locations, such as at corner locations A and B.

Figure 12:
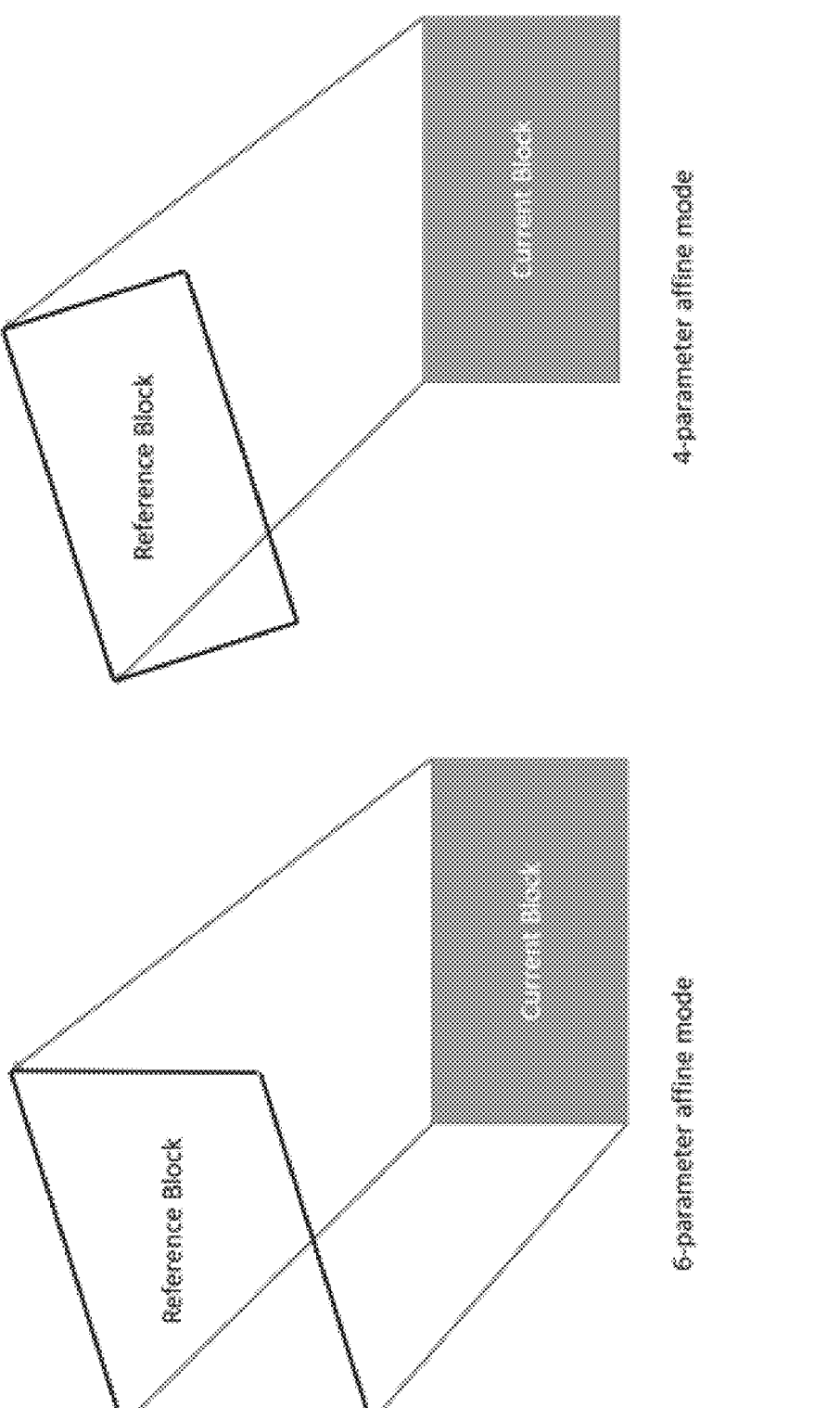
FIG. 12 shows examples of affine transformation according to some embodiments of the disclosure.

FIG. 12 shows examples of affine transformation for a 6-parameter affine mode (using 6-parameter affine model) and a 4-parameter affine mode (using 4-parameter affine model).

In an example, when assumptions are made such that the object only has zooming and translational motions, or the object only has rotation and translation models, then the affine motion model can be further simplified to a 3-parameter affine motion model with 2 parameters to indicate the translational part and 1 parameter to indicate either a scaling factor for zooming or an angular factor for rotation.

According to an aspect of the disclosure, when affine motion compensation is used, two signaling techniques can be used. The two signaling techniques are referred to as a merge mode based signaling technique and a residue (AMVP) mode based signaling technique.

For the merge mode based signaling technique, the affine information of the current block is predicted from previously affine coded blocks. In one method, the current block is assumed to be in the same affine object as the reference block, so that the MVs at the control points of the current block can be derived from the reference block's model. The MVs at the current block' other locations are just linearly modified in the same way as from one control point to another in the reference block. This method is referred to as model based affine prediction. In another method, neighboring blocks' motion vectors are used directly as the motion vectors at current block's control points. Then motion vectors at the rest of the block are generated using the information from the control points. This method is referred as control point based affine prediction. In either method, no residue components of the MVs at current block are to be signaled. In other words, the residue components of the MVs are assumed to be zero.

For the residue (AMVP) mode based signaling technique, affine parameters, or the MVs at the control points of the current block, are to be predicted. Because there are more than one motion vectors to be predicted, the candidate list for motion vectors at all control points is organized in grouped way such that each candidate in the list includes a set of motion vector predictors for all control points. For example, candidate 1={predictor for control point A, predictor for control point B, predictor for control point C}; candidate 2={predictor for control point A, predictor for control point B, predictor for control point C}, etc. The predictor for the same control point in different candidates can be the same or different. The motion vector predictor flag (mvp_10_flag for List 0 or mvp_11_flag for List 1) will be used to indicate which candidate from the list is chosen. After prediction, the residue part of the parameter, or the differences of the actual MVs to the MV predictors at the control points, are to be signaled. The MV predictor at each control point can also come from model based affine prediction from one of its neighbors, and the method described from the above description for affine merge mode can be used.

In some related methods, affine parameters for a block can be either purely derived from neighboring block's affine model or control points' MV predictor, or from explicitly signal the MV differences at the control points. However, in many cases the non-translational part of the affine parameters is very close to zero. Using unrestricted MV difference coding to signal the affine parameters has redundancy.

Aspects of the disclosure provide new techniques to better represent the affine motion parameters therefore improve coding efficiency of affine motion compensation. More specifically, to predict affine model parameters in a more efficient way, the translational parameters of a block are represented using a motion vector prediction, in the same way or similar way as that is for a regular inter prediction coded block. For example, the translational parameters can be indicated from a merge candidate. For the non-translational part, a few typically used parameters such as rotation parameter and zooming parameter are pre-determined with a set of fixed offset values. These values are considered as some refinements or offset around the default value. The encoder can evaluate the best option from these values and signal the index of the choice to the decoder. The decoder then restores the affine model parameters using 1) the decoded translational motion vector and 2) the index of the chosen non-translational parameters.

In the following description, 4-parameter affine model is used as an example, the methods described in the following description can be extended to other motion models, or affine models with different numbers of parameters as well, such as 6-parameter affine model, and the like. In some of the following description, the model used may not be always affine model, but possibly other types of motion model.

In an example, a 4-parameter affine model is described, such as shown by Eq. 1

$$\begin{cases} x' = \rho\cos\theta \cdot x + \rho\sin\theta \cdot y + c \\ y' = -\rho\sin\theta \cdot x + \rho\cos\theta \cdot y + f \end{cases} \quad \text{(Eq. 1)}$$

where $\rho$ is the scaling factor for zooming, $\theta$ is the angular factor for rotation, and (c, f) is the motion vector to describe the translational motion. (x, y) is a pixel location in the current picture, (x', y') is a corresponding pixel location in the reference picture.

Let $\alpha=\rho\cos\theta$, and $b=\rho\sin\theta$, Eq. 1 may become the following form as in Eq. 2

$$\begin{cases} x' = a \cdot x + b \cdot y + c \\ y' = -b \cdot x + a \cdot y + f \end{cases} \quad \text{(Eq. 2)}$$

Thus, a 4-parameter affine model can be represented by a set of model-based parameters {$\rho$, $\theta$, c, f}, or {a, b, c, f}.

From Eq. 2, the motion vector ($MV_x$, $MV_y$) at pixel position (x, y) may be described as in Eq. 3, $$\begin{cases} MV_x = x' - x = a'x + by + c \\ MV_y = y' - y = -bx + a'y + f \end{cases} \quad \text{(Eq. 3)}$$

Where a' is equal to ($\alpha-1$), $MV_x$ is the horizontal motion vector value, and $MV_y$ is the vertical motion vector value.

In some examples, the 4-parameter affine model can also be represented by the motion vectors of two control points, CP0 and CP1, of the block. Similarly, three control points may be required to represent a 6-parameter affine model.

Figure 13:
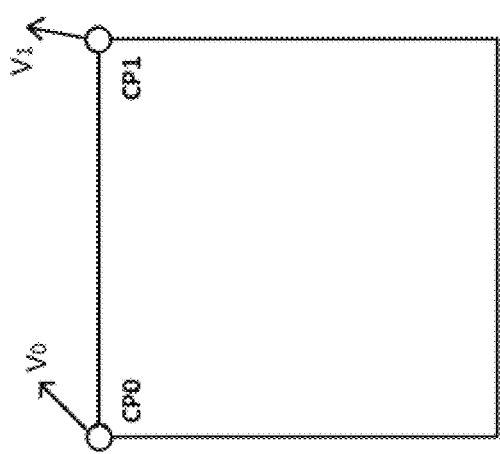
FIG. 13 shows a plot that illustrates control points CP0 and CP1 for a current block.

FIG. 13 shows a plot that illustrates control points CP0 and CP1 for a current block.

Using two control points CP0 and CP1, the motion vector at position (x, y) in the current block can be derived using Eq. 4:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad \text{(Eq. 4)}$$

where ($v_{0x}$, $v_{0y}$) is motion vector of the top-left corner control point CP0 as depicted in FIG. 13, and ($v_{1x}$, $v_{1y}$) is motion vector of the top-right corner control point CP1 as depicted in FIG. 13. In the example of control-point based model, the affine model of the block may be represented by {$v_{0x}$, $v_{0y}$, $v_{1x}$, $v_{1y}$}.

In some related examples, affine parameters for a block can be either purely derived from neighboring block's affine model or control points' MV predictor, or from explicitly signaling of the MV differences at the control points. However, in many cases the non-translational part of the affine parameters is very close to zero. Using unrestricted MV difference coding to signal the affine parameters has redundancy. New techniques to better represent the affine motion parameters are developed to improve coding efficiency.

Aspects of the disclosure provide techniques for improving coding efficiency of affine merge and affine motion vector coding. The techniques may be used in advanced video codec to improve the coding performance of affine inter prediction. The motion vector here may refer to block mode (conventional motion vector where one whole block uses a set of motion information), such as the merge candidates in HEVC standard. The motion vector here may also refer to sub-block mode (for different parts of the block, different sets of motion information may apply), such as affine mode and advanced temporal MV prediction (ATMVP) in VVC.

It is noted that the proposed methods may be used separately or combined in any order. In the following description, the term block may be interpreted as a prediction block, a coding block, or a coding unit, i.e. CU. It is proposed to predict current block's affine model based on control point motion vectors (CPMVs) at 2 or 3 corners. After the CPMVs are predicted using model-based affine merge prediction or constructed control-point based affine merge prediction, an available affine merge candidate may be selected as the base predictor.

In some embodiments, a flag, such as an affine_merge_with_offset usage flag, is signaled to indicate whether the proposed method is used. When the affine_merge_with_offset usage flag is indicative of using the proposed method, the number of base predictor candidates (e.g., the number of affine merge candidates) to be selected from may be determined based on a pre-defined value or a signaled value. In an example, the number of base predictor candidates is a predefined default value that is known and then used by both encoder and decoder. In another example, the encoder side determines the number of base predictor candidates and signals the number of base predictor candidates in the coded video bitstream, such as, but not limited to, in sequence parameter set (SPS), picture parameter set (PPS), or slice header.

In an example, when the number of base predictor candidate is 1, the base predictor index is not signaled in the coded video bitstream, and the first available affine merge candidate is used as the base predictor. When the number of base predictor candidates is greater than 1, the base predictor index is signaled in the coded video bitstream to indicate which affine merge candidate to be used as the base predictor.

After the base predictor is determined, CPMV values of the base predictor may be used as starting point, and distance offset values may be added on top of CPMV values to generate current block's CPMV values.

The offset values may be determined by the offset parameters. In some examples, an offset parameter is provided in a form of offset direction index and offset distance index. For example, the offset direction index is signaled to indicate on which component(s) the offset may be applied to a CPMV. It may be on CPMV's horizontal and/or vertical direction. In an embodiment, there may be 4 offset directions for each control point as shown below in Table 1, where only x or y direction has MV difference, but not on both directions:

TABLE 1

| Mapping of Offset Direction IDXs to Offset Directions | | | | |
|---|---|---|---|---|
| Offset Direction IDX | 00 | 01 | 10 | 11 |
| x-axis | +1 | −1 | 0 | 0 |
| y-axis | 0 | 0 | +1 | −1 |

In another embodiment, there's no limitation of only x or y has MV difference, then the table for offset direction IDX may become as shown in Table 2, one of the eight offset directions may be used:

TABLE 2

| Mapping of Offset Direction IDXs to Offset Directions | | | | | | | | |
|---|---|---|---|---|---|---|---|---|
| Offset Direction IDX | 000 | 001 | 010 | 011 | 100 | 101 | 110 | 111 |
| x-axis | +1 | −1 | 0 | 0 | +1 | −1 | +1 | −1 |
| y-axis | 0 | 0 | +1 | −1 | +1 | −1 | −1 | +1 |

The offset distance index is signaled to indicate the magnitude of offset distance to be applied on the CPMV. In an example, the offset distance index is signaled in the form of pixel distance. In some embodiments, an offset distance table is used, and each offset distance index is mapped to offset distance in number of pixels according to the offset distance table. The offset distance value may be integer or fractional values. The offset distance value indicates that the offset to be applied to the base predictor's motion vector value.

In one example, a offset distance table with size of 4 is as shown in Table 3. The offset distance values in the table are {½, 1, 2, 4}, in terms of pixels.

TABLE 3

| Mapping of Offset Distance IDXs to Offset Distances | | | | |
|---|---|---|---|---|
| Offset Distance IDX | 0 | 1 | 2 | 3 |
| Offset Distance | ½-sample | 1-sample | 2-sample | 4-sample |

In another example, an offset distance table with size of 5 is as shown in the Table 4. The offset distance values in the table are {½, 1, 2, 4, 8}, in terms of pixels.

TABLE 4

| Mapping of Offset Distance IDXs to Offset Distances | | | | | |
|---|---|---|---|---|---|
| Offset Distance IDX | 0 | 1 | 2 | 3 | 4 |
| Offset Distance | ½-sample | 1-sample | 2-sample | 4-sample | 8-sample |

In another example, the mapping of offset distance values with 8 indices is shown in Table 5. The offset distance values are in range of ¼ pixels to 32 pixels.

TABLE 5

| Mapping of Offset Distance IDXs to Offset Distances | | | | | | | | |
|---|---|---|---|---|---|---|---|---|
| Offset Distance IDX | 0 | 1 | 2 | 3 | 4 | 5 | 6 | 7 |
| Offset Distance | ¼-sample | ½-sample | 1-sample | 2-sample | 4-sample | 8-sample | 16-sample | 32-sample |

The number of distance indices and/or the value of pixel distance corresponding to each distance index may have different values in different ranges, they are not limited by the aforementioned examples.

In an embodiment, the offset direction index and the offset distance index may be signaled only once for all control points, and the same offset distance may be applied to all CPMVs on the same offset direction.

In another embodiment, the offset direction index and the offset distance index parameters may be signaled for each control point separately. Each CPMV has a corresponding offset magnitude applied on a corresponding offset direction.

In some embodiments, when offset parameters are signaled for each control point, a zero_MVD flag may be signaled before offset parameters to indicate whether the motion vector difference is zero for the corresponding CPMV. When the zero_MVD flag is true, in an example, offset parameters are not signaled for the corresponding CPMV. In an embodiment, when N control points are available (N is a positive integer), and the first N−1 control points have zero_MVD flags that are true, the last control point's zero_MVD may be inferred to be false, so that its zero_MVD flag for the last control point is not signaled.

In another embodiment, when one set of offset parameters is signaled for all control points, zero_MVD flag may not be signaled.

Aspects of the disclosure provide techniques to signal offset parameters.

In an embodiment, each control point has its offset parameters signaled separately. In an example, the current block's merge flag and affine_merge_with_offset usage flag are both true. When more than one predictor candidates are existed to be potentially used for base predictor, base predictor index is signaled from the encoder side to the decoder side in an example. In another example, no base predictor index is signaled, and predefined base predictor index can be used on the encoder side and the decoder side.

Further, for each control point (CP) of current block, Zero_MVD flag is signaled for the CP. When the CP is the last CP of the block, and all other CPs have Zero_MVD equal to 1 (true), Zero_MVD flag for the last CP is inferred to 0 (false) without signaling.

For each CP, when the Zero_MVD flag is true, CPMV is set to be the same as base predictor's corresponding CPMV value. However, when the Zero_MVD flag is false, offset distance index and offset direction index for the CP are signaled in an example. Based on the offset distance index and offset direction index, the offset distance and the offset direction can be determined for example based on Tables 1-5. Then, CPMV value is generated from the base predictor's corresponding CPMV predictor value with the offset distance applied on the offset direction.

In some examples, the number of control points for the current block is determined by the affine model type of the base predictor. When the base predictor uses 4-parameter affine model, the current block uses 2 control points. When the base predictor uses 6-parameter affine model, the current block uses 3 control points.

In an example, the base predictor uses four-parameter affine model, and the parameters that are signaled include a usage flag (e.g., affine_merge_with_offset usage flag is equal to true), the base predictor index, zero_MVD flag (false) for a first CP (also referred to as CP0), offset distance index for the first CP, offset direction index for the first CP, zero_MVD flag (false) for a second CP (also referred to as CP1), offset distance index for the second CP, and offset direction index for the second CP.

In another example, the base predictor uses six-parameter affine model, and the parameters that are signaled include a usage flag (e.g., affine_merge_with_offset usage flag is equal to true), the base predictor index, zero_MVD flag (false) for a first CP (also referred to as CP0), offset distance index for the first CP, offset direction index for the first CP, zero_MVD flag (false) for a second CP (also referred to as CP1), offset distance index for the second CP, offset direction index for the second CP, zero_MVD flag (false) for a third CP (also referred to as CP2), offset distance index for the third CP, offset direction index for the third CP.

In other embodiment, one set of offset parameters is signaled for all control points. In some examples, the current block's merge flag and affine_merge_with_offset usage flag are both true. When more than one predictor candidates are existed to be potentially used for base predictor, base predictor index is signaled from the encoder side to the decoder side in an example. In another example, no base predictor index is signaled, and predefined base predictor index can be used on the encoder side and the decoder side. For the current block, one set of offset distance index and offset direction index is signaled. Based on the offset distance index and the offset direction index, the offset distance and the offset direction are determined. Then, the current block's CPMV values are generated from the base predictor's corresponding CPMV predictor values with the offset distance applied on the offset direction.

In an example, the parameters that are signaled include a usage flag (e.g., affine_merge_with_offset usage flag is equal to true), the base predictor index, offset distance index for the current block, and offset direction index for the current block.

Aspects of the disclosure provide techniques for calculate CPMV values.

In some embodiments, when the inter prediction is uni-prediction, the motion vector difference in the form of applying the offset distance (determined based on the offset distance index decoded from the coded video bitstream) on the offset direction (determined based on the offset direction index decoded from the coded video bistream) is used for each control point predictor. The motion vector difference is then used to determine the MV value of each control point.

For example, when base predictor is uni-prediction, and the motion vector values of a control point of the base predictor is denoted as MVP (vpx, vpy). When offset distance index and offset direction index are signaled, the motion vectors of current block's corresponding control points will be calculated using Eq. 5. The distance_offset denotes to the offset distance value that is determined based on the offset distance index. The x_dir_factor and y_dir_factor denotes the offset direction factor (e.g, 1 or −1) on x-axis and y-axis respectively, which are determined based on the offset direction index.

$$MV(vx, vy) = MVP(vpx, vpy) + \qquad \text{(Eq. 5)}$$
$$MV(\text{x\_dir\_factor} \times \text{distance\_offset}, \text{y\_dir\_factor} \times \text{distance\_offset})$$

In an embodiment, offset mirroring is used for bi-prediction CPMVs. The motion vector difference (in the form of offset distance and offset direction) can be applied, in opposite directions, to motion vectors of the control points that refer to a reference picture from the L0 list and to motion vectors of the control points that refer to a reference picture from the L1 list. When the inter prediction is bi-prediction, the motion vector difference (in the form offset distance and offset direction) is applied to the L0 motion vectors (motion vectors that refer to a reference picture from the L0 list) of the control point predictor to calculate the L0 motion vectors (motion vectors that refer to a reference picture from the L0 list) of the control points for the current block; and the motion vector difference is also applied to the L1 motion vectors (motion vectors that refer to a reference picture from the L1 list) of the control point predictor but in an opposite direction to calculate the L1 motion vectors (motion vectors that refer to a reference picture from the L1 list) of the control points for the current block. The calculation results will be the MV values of each control point, on each inter prediction direction.

For example, when base predictor is bi-prediction, and the motion vector values of a control point on L0 (motion vectors that refer to a reference picture from the L0 list) is denoted as MVPL0 (v0px, v0py), and the motion vector values of that control point on L1 (motion vectors that refer to a reference picture from the L1 list) is denoted as MVPL1 (v1px, v1py). When offset distance index and offset direction index are signaled, the motion vectors of current block's corresponding control points can be calculated using Eq. 6 and Eq. 7:

$$MVL0(v0x, v0y) = MVPL0 = (v0px, v0py) + \qquad \text{Eq. 6}$$
$$MV(\text{x\_dir\_factor} \times \text{distance\_offset}, \text{y\_dir\_factor} \times \text{distance\_offset})$$

-continued $$MVL1(v0x, v0y) =$$ <span style="float:right">Eq. 7</span>

$$MVPL1 = (v0px, v0py) + MV(-\text{x\_dir\_factor} \times \text{distance\_offset},$$

$$-\text{y\_dir\_factor} \times \text{distance\_offset}) \qquad 5$$

According to another aspect of the disclosure, the CPMV calculation using offset mirroring is conditionally performed for bi-prediction CPMV calculation, for example based on the reference picture's location with regard to the current picture.

In an example, when the inter prediction is bi-prediction, the motion vector values of the control points from the L0 list (motion vectors that refer to a reference picture from the L0 list) is calculated in the same way as above, the signaled offset distance is applied on the signaled offset direction for control point predictor's L0 motion vector (motion vectors that refer to a reference picture from the L0 list).

When the reference pictures from L0 and L1 are on the opposite sides of the current picture, to calculate the motion vectors for the control points from L1 list (motion vectors that refer to a reference picture from the L1 list), the same offset distance with opposite offset direction (from the signaled offset direction) is applied for control point predictor's L1 motion vector (motion vectors that refer to a reference picture from the L1 list).

When the reference pictures from L0 and L1 are on the same side of the current picture, to calculate the motion vectors for the control points from L1 list, the same offset distance with same offset direction (as the signaled offset direction) is applied for control point predictor's L1 motion vector (motion vectors that refer to a reference picture from the L1 list).

It is noted that in some embodiments, the offset distance applied on the reference picture from L1 list is the same as the offset distance applied on the reference picture from L0 list; and in some other embodiments, the offset distance applied on the reference picture from L1 list is scaled according to the ratio of distance of reference picture from L0 list to the current picture and distance of reference picture from L1 list to the current picture.

In an embodiment, the distance offset applied on the reference picture from the L1 list is the same as the distance offset applied on the reference picture from the L0 list.

In an example, when base predictor is bi-prediction, and the motion vector values of a control point (of the base predictor) on a reference picture from the L0 list is denoted as MVPL0 (v0px, v0py), and the motion vector values of that control point (of the base predictor) on a reference picture from the L1 list is denoted as MVPL1 (vipx, v1py). The reference pictures from the L0 list and the L1 list are on the opposite side of the current picture. When offset distance index and offset direction index are signaled, the motion vectors of current block's corresponding control points can be calculated using Eq. 6 and Eq. 7 shown above.

In another embodiment, the offset distance applied on reference picture from L1 list is scaled according to the ratio of distance of reference picture from L0 list to the current picture and distance of reference picture from L1 list to the current picture.

In an example, when the base predictor is bi-prediction, and the motion vector values of a control point (of the base predictor) on the reference picture from the L0 list is denoted as MVPL0 (v0px, v0py), and the motion vector values of that control point (of the base predictor) on the reference picture from the L1 list is denoted as MVPL1 (v1px, v1py).

When offset distance index and offset direction index are signaled, the motion vectors of current block's corresponding control points can be calculated using Eq. 8 and Eq. 9.

$$MVL0(v0x, v0y) = MVPL0(v0px, v0py) + \qquad \text{(Eq. 8)}$$
$$MV(\text{x\_dir\_factor} \times \text{distance\_offset}, \text{y\_dir\_factor} \times \text{distance\_offset})$$

$$MVL1(v0x, v0y) = MVPL1(v0px, v0py) + \qquad \text{(Eq. 9)}$$
$$MV(\text{x\_dir\_factor} \times \text{distance\_offset} \times \text{scaling\_factor},$$
$$\text{y\_dir\_factor} \times \text{distance\_offset} \times \text{scaling\_factor})$$

The scaling_factor is calculated based on the POC number of current picture (denoted as current_POC), the POC number of the reference picture on the L0 list (denoted as POC_L0), and the POC number of the reference picture on the L1 list (denoted as POC_L1) according to (Eq. 10):

$$\text{scaling\_factor} = \qquad \text{(Eq. 10)}$$
$$(POC\_L1 - \text{current\_POC})/(POC\_L0 - \text{current\_POC})$$

FIG. 14 shows a flow chart outlining a process (1400) according to an embodiment of the disclosure. The process (1400) can be used in the reconstruction of a block coded in intra mode, so to generate a prediction block for the block under reconstruction. In various embodiments, the process (1400) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1400) is implemented in software instructions, thus when the processing circuitry executes the software instructions, the processing circuitry performs the process (1400). The process starts at (S1401) and proceeds to (S1410).

At (S1410), prediction information of a current block in a current picture is decoded from a coded video bitstream. The prediction information is indicative of an affine merge mode with offset.

At (S1420), in response to the affine merge mode with offsest, a set of offset parameters is decoded from the coded video bitstream. Based on the set of offset parameters, a motion vector difference is determined. In some examples, the motion vector different is used in the form of applying an offset distance to an offset direction.

At (S1430), the motion vector difference is applied to first motion vectors of multiple control points from a base predictor of the current block to calculate second motion vectors at corresponding multiple control points of the current block.

At (S1440), parameters of an affine model are determined based on the second motion vectors at the corresponding multiple control points of the current block.

At (S1450), samples of the current block are reconstructed based on the affine model. For example, for a sample of the current block, a motion vector at the sample is calculated according to the affine model. Thus, in an example, the sample is constructed based on a reference sample in a reference picture that is pointed by the motion vector. Then, the process proceeds to (S1499) and terminates.

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
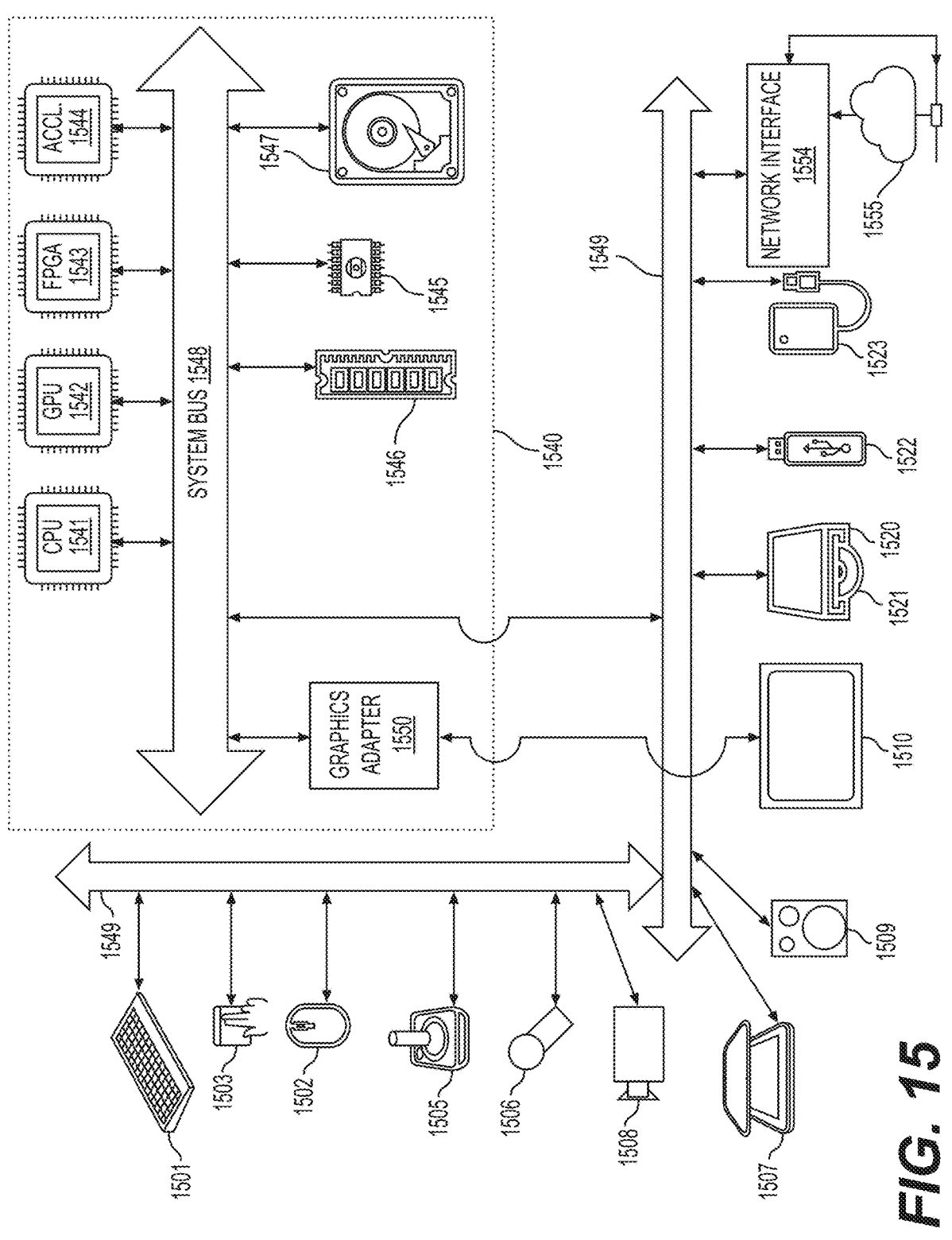
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hard-wired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUT: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding, comprising:
acquiring coded information of a current block in a coded video bitstream, the coded information indicating that the current block is coded with affine merge mode with offset;
decoding, from the coded video bitstream, an offset direction index and an offset distance index for the affine merge mode with offset defining a corresponding a motion vector difference for a plurality of control points of a base predictor;
applying the motion vector difference defined by the offset direction index and the offset distance index to first motion vectors of the plurality of control points that are indicated by the base predictor of the current block to determine second motion vectors of the corresponding plurality of control points;
determining parameters of an affine model of the affine merge mode with offset based on the second motion vectors; and
reconstructing at least a sample of the current block according to the affine model.

2. The method of claim 1, further comprising:
decoding, from the coded video bitstream, a number of base predictor candidates; and
when the number of base predictor candidates is determined to be greater than one, decoding, from the coded video bitstream, a base predictor index indicating the base predictor, wherein
when the number of base predictor candidates is 1, the coded video bitstream does not include the base predictor index.

3. The method of claim 1, further comprising:
determining a number of base predictor candidates based on a predefined value; and
when the number of base predictor candidates is determined to be greater than one, decoding, from the coded video bitstream, a base predictor index indicating the base predictor, wherein
when the number of base predictor candidates is 1, the coded video bitstream does not include the base predictor index.

4. The method of claim 1, wherein the offset direction index refers to a predefined mapping table defining a correspondence between the offset direction index and a direction along at least one of an x axis and a y axis.

5. The method of claim 1, wherein the offset distance index refers to a predefined mapping table defining a correspondence between the offset distance index and a distance measured in pixels.

6. The method of claim 1, further comprising determining a number of the plurality of control points based on an affine model type of the base predictor.

7. The method of claim 1, wherein the base predictor indicates a bi-prediction associated with a first reference picture and a second reference picture;

the first motion vectors and the second motion vectors refer to the first reference picture;

each of the second motion vectors is a sum of the motion vector difference and a respective one of the first motion vectors;

a control point of the plurality of control points is associated with (i) one of the first motion vectors that refers to the first reference picture and (ii) a third motion vector that refers to the second reference picture, the third motion vector being indicated by the base predictor;

the method includes applying a second motion vector difference that is opposite in direction to the motion vector difference to the third motion vector that is associated with the second reference picture to obtain a fourth motion vector associated with the second reference picture, the second motion vector difference being a mirror of the motion vector difference; and the determining the parameters of the affine model includes determining the parameters of the affine model of the affine merge mode with offset based on the second motion vectors and the fourth motion vector.

8. The method of claim 1, wherein a zero motion vector difference flag for each of the plurality of control points that indicates whether the motion vector difference for a respective one of the first motion vectors is zero is not included in the coded information.

9. A method for video encoding, comprising:

determining a corresponding second motion vector for each of a plurality of control points of a current block in a current picture, the current block being coded with an affine merge mode with offset;

determining a motion vector difference for the plurality of control points based on the determined second motion vectors and first motion vectors for the plurality of control points that are indicated by a base predictor;

determining parameters of an affine model of the affine merge mode with offset based on the determined second motion vectors;

encoding at least a sample of the current block according to the affine model;

generating coded information of the current block in the current picture to be included in a video bitstream, the coded information including an offset direction index and an offset distance index for the affine merge mode with offset, the offset direction index and the offset distance index defining the motion vector difference for the plurality of control points; and generating the video bitstream including the generated coded information.

10. The method of claim 9, comprising:

indicating a number of base predictor candidates in the generated coded information; and when the number of base predictor candidates is greater than one, indicating, in the video bitstream, a base predictor index indicating the base predictor, wherein when the number of base predictor candidates is 1, the video bitstream does not include the base predictor index.

11. The method of claim 9, comprising:

when a number of base predictor candidates is greater than one, indicating, in the video bitstream, a base predictor index indicating the base predictor, wherein when the number of base predictor candidates is 1, the video bitstream does not include the base predictor index.

12. The method of claim 9, wherein the offset direction index refers to a predefined mapping table defining a correspondence between the offset direction index and a direction along at least one of an x axis and a y axis.

13. The method of claim 9, wherein the offset distance index refers to a predefined mapping table defining a correspondence between the offset distance index and a distance measured in pixels.

14. The method of claim 10, further comprising determining a number of the plurality of control points based on an affine model type of the base predictor.

15. The method of claim 9, wherein the base predictor indicates a bi-prediction associated with a first reference picture and a second reference picture;

the first motion vectors and the determined second motion vectors refer to the first reference picture;

each of the determined second motion vectors is a sum of the motion vector difference and a respective one of the first motion vectors;

a control point of the plurality of control points is associated with (i) one of the first motion vectors that refers to the first reference picture and (ii) a third motion vector that refers to the second reference picture, the third motion vector being indicated by the base predictor, a second motion vector difference associated with the second reference picture is opposite in direction to the determined motion vector difference and is a mirror of the determined motion vector difference, a fourth motion vector being a sum of the second motion vector difference and the third motion vector; and the determining the parameters of the affine model includes determining the parameters of the affine model of the affine merge mode with offset based on the determined second motion vectors and the fourth motion vector.

16. The method of claim 9, wherein a zero motion vector difference flag for each of the plurality of control points that indicates whether the motion vector difference for a respective one of the first motion vectors is zero is not signaled in the coded information.

17. The method of claim 1, wherein the base predictor indicates a uni-prediction associated with a first reference picture;

the first motion vectors and the second motion vectors refer to the first reference picture; and each of the second motion vectors is a sum of the motion vector difference and a respective one of the first motion vectors.

18. The method of claim 9, wherein the base predictor indicates a uni-prediction associated with a first reference picture;

the first motion vectors and the determined second motion vectors refer to the first reference picture; and each of the determined second motion vectors is a sum of the motion vector difference and a respective one of the first motion vectors.

19. A non-transitory computer-readable storage medium storing instructions which when executed by a processor cause the processor to perform a method of encoding a video bitstream comprising:

determining a corresponding second motion vector for each of a plurality of control points of a current block in a current picture, the current block being coded with an affine merge mode with offset;

determining a motion vector difference for the plurality of control points based on the determined second motion vectors and first motion vectors for the plurality of control points that are indicated by a base predictor;

determining parameters of an affine model of the affine merge mode with offset based on the determined second motion vectors;

encoding at least a sample of the current block according to the affine model;

generating coded information of the current block in the current picture to be included in a video bitstream, the coded information including an offset direction index and an offset distance index for the affine merge mode with offset, the offset direction index and the offset distance index defining the motion vector difference for the plurality of control points;

generating the video bitstream including the generated coded information; and transmitting the generated video bitstream.

\* \* \* \* \*